United States Patent
Kwon et al.

(10) Patent No.: US 6,839,492 B2
(45) Date of Patent: Jan. 4, 2005

(54) PACKAGING DEVICE FOR OPTICAL WAVEGUIDE ELEMENT

(75) Inventors: Oh-Dal Kwon, Suwon-shi (KR); Hee-Choon Kang, Suwon-shi (KR); Jeong-Hwan Song, Seoul (KR); Young-Hui Song, Suwon-shi (KR)

(73) Assignee: Samsung Electronics Co., LTD, Suwon-Si (KR)

( * ) Notice: Subject to any disclaimer, the term of this patent is extended or adjusted under 35 U.S.C. 154(b) by 195 days.

(21) Appl. No.: 10/093,000

(22) Filed: Mar. 7, 2002

(65) Prior Publication Data

US 2003/0021539 A1 Jan. 30, 2003

(30) Foreign Application Priority Data

Jul. 24, 2001 (KR) ..................................... 2001-0044380

(51) Int. Cl.[7] .................................................. G02B 6/26
(52) U.S. Cl. .............................. 385/50; 385/49; 385/52
(58) Field of Search ............................... 385/31–32, 39, 385/50, 52, 132, 49

(56) References Cited

U.S. PATENT DOCUMENTS 5,841,919 A      11/1998  Akiba et al. .................. 385/37
6,122,423 A  *   9/2000   You et al. ...................... 385/49

FOREIGN PATENT DOCUMENTS

| EP | 0911660 A1 | 4/1999 | ............ G02B/6/34 |
| EP | 1158327 A2 | 11/2001 | ............ G02B/6/293 |
| EP | 1168013 A2 | 1/2002 | ............ G02B/6/34 |

* cited by examiner

Primary Examiner—Frank G. Font
Assistant Examiner—Michael P. Mooney
(74) Attorney, Agent, or Firm—Cha & Reiter, L.L.C.

(57) ABSTRACT

A packaging device for alignment between a planar lightguide circuit and an optical-fiber block is disclosed. The device includes a planar lightguide circuit and a single optical-fiber block. The planar lightguide circuit includes an input port of an input waveguide, a plurality of output ports of output waveguides, arranged on the same surface as the input port of the input waveguide, and at least one dummy waveguide arranged abutting the outermost end of the output waveguides. An output port of the dummy waveguide is arranged on the same surface. The single optical-fiber block includes a plurality of ports corresponding to the input/output ports. The input/output ports are coupled in alignment with the input port of the input waveguide and the output ports of the output waveguides. The invention enables making a single processed alignment of the input/output ports of the planar lightguide circuit and the single input/output ports.

20 Claims, 12 Drawing Sheets

PACKAGING DEVICE FOR OPTICAL WAVEGUIDE ELEMENT

CLAIM OF PRIORITY

This application makes reference to and claims all benefits accruing under 35 U.S.C. Section 119 from an application entitled, "Packaging Device for Optical Waveguide Element," filed in the Korean Industrial Property Office on Jul. 24, 2001 and there duly assigned Serial No. 2001-44380.

BACKGROUND OF THE INVENTION

1. Field of the Invention

The present invention generally relates to a planar lightguide circuit (PLC) for use in wavelength-division multiplexing/demultiplexing optical communication systems and, in particular, to a packaging device for aligning a planar lightguide circuit and an optical-fiber block to produce a combined single module.

2. Description of the Related Art

In general, a wavelength-division-multiplexing (WDM) communication system involves transfers of multiple wavelengths of optical signals on a single strand of fiber. At the receiving ends, the optical signal received is divided into a plurality of optical signals with a respective wavelength and then converted into electrical signals. To this end, an arrayed-waveguide-grating (AWG) is mainly utilized in the receiving ends to effect such division of the optical signal into multiple wavelengths.

Recently, much research has been focused in the field of optical communication, in particular, on the integration of planar-lightguide-circuit (PLC) elements for forming an optical-waveguide element on a planar substrate. As such, the PLC is used for processing optical signals in a variety of operations, such as branching, modulation, switching, or multiplexing/demultiplexing of the optical signals. The PLC incorporates optical waveguides, which are used for propagating optical signals along the length, i.e., in the longitudinal direction, of an optical-fiber cable. The optical waveguides, consisting of a core member with a high refractive index and a cladding member with a low refractive index, are typically formed by multiple thin layers of silica or polymer on the silicon or quartz substrate and serve various functions such as splitting an optical signal, changing its path or adjusting its light intensity based on the difference in the refractive index between the core and its surrounding cladding.

Referring to FIGS. 1 and 2, a prior-art packaging device for fabricating a planar-light-guide-circuit (PLC) 10 will be explained hereinafter. For simplicity and clarity, a discussion pertaining to well-known components of the PLC and an adhesion means (B) in FIG. 2 is omitted. As shown in FIGS. 1 and 2, the PLC element 10 includes a set of aligned optical-fiber blocks 20 and 30 for receiving and outputting an optical signal. The input optical-fiber block 20 and the output optical-fiber block 30 are positioned in alignment with an input port 12a and output ports 18a of the PLC 10, respectively, for supporting the optical-fiber cables (a single fiber-optic cable F1 or a ribbon-type, fiber-optic cable F2). The optical cables are generally disposed in a V-shaped groove (not shown) formed on a silicon substrate and fixed to the input port 12a and the output ports 18a of the PLC 10 by an adhesion material (B), i.e., epoxy resins. The PLC 10 operates to multiplex wavelengths, in which a multiple wavelength signal is inputted into an input waveguide 12 and the respective multiplexed wavelength appears at each output waveguide 18. The PLC 10 further includes an input waveguide 12 provided before an arrayed waveguide grating (AWG) and an output waveguides 18 provided after the arrayed waveguide grating in opposite end. A first start coupler 14 and a second star coupler 16 are disposed between the input waveguide and the output waveguides before and after the arrayed waveguide grating.

The prior-art packaging device as described above is configured so that the input optical-fiber block 20 is in alignment with and fixed to the input port 12a of the input waveguide using a precise position-control device (not shown). Similarly, the output optical-fiber block 30 is in alignment with and fixed to the output ports 18a of the output waveguides using the same positioning device. Both blocks are then sealed into a housing (not shown) to complete the packaging. As such, multiple optical signals received by the single fiber-optic cable F1 and pass through, sequentially, the input port 12a, input waveguide 12, first star coupler 14, arrayed-waveguide-grating (AWG), second star coupler 16, output waveguides 18, and output ports 18a, toward the ribbon-type fiber-optic cable F2. Furthermore, glass upper plates G1 to G4 are provided to enhance the stability of those components, such as the PLC 10, the input or output optical-fiber blocks 20 and 30, during the manufacturing process. However, the prior-art planar-light-guide circuit has drawbacks in that it is necessary to align each of the input/output optical-fiber blocks 20 and 30 with the corresponding input and output ports 12a and 18a, then project a wide-band laser signal thereto and then make a measurement on each wave-guide using a proper optical-power-measuring device, i.e., an optical lens (not shown), to make sure the alignment and packaging are properly completed.

FIGS. 3 and 4 describe another prior-art-packaging device, which includes a beam splitter 110 and a pair of input and output optical-fiber blocks 120 and 130, each coupled in alignment with the input end and the output end of the beam splitter 110. The beam splitter 110 is provided with an input waveguide 112 and a plurality of output waveguides 114 branched out from the input waveguide 112, forming a Y-shaped branched connection of waveguides. A single fiber-optic cable 122 is connected to the input optical-fiber block 120, and a ribbon-type fiber-optic cable 132 is connected to the output optical-fiber block 130. The beam splitter 110 is also provided with an input port 112a and output ports 114a respectively at both opposite ends, such that the input port 112a is disposed at one end of the beam splitter 110 facing the input optical-fiber block 120, while the output ports 114a are disposed at both opposite ends facing the output optical-fiber block 130. Due to the complexity in the structure, it is often difficult to precisely align the input and output optical-fiber blocks with respect to the input and output ports of the optical waveguide including the beam splitter. In particular, it requires twice as much time to implement the alignment processes, i.e., first aligning the input optical-fiber block with the planar lightguide circuit and then aligning the output optical-fiber block in a similar manner. As a result, productivity and reliability are compromised. In addition, the thermal deformation that may occur in the course of bonding the optical elements with any adhesive material or epoxy resin during the alignment process will also produce an adverse effect on reliability. Furthermore, the prior-art alignment scheme of the planar lightguide circuit usually requires at least two optical-fiber blocks, spaced apart opposite to each other, such that the total size or volume of the associated optical module is undesirably large.

SUMMARY OF THE INVENTION

The present invention is related to a packaging device for producing a planar light-guide circuit, in which the alignment process time between the planar light-guide circuit and an optical-fiber block is greatly reduced, by arranging an input port and an output port of the planar light-guide circuit on one end of the same surface.

It is an object of the present invention to provide a packaging device for a planar lightguide circuit having a structure more suitable for miniaturization and simplification of its structure.

It is another object of the present invention to provide a packaging device for a planar lightguide circuit having a structure more suitable for reduction in the production cost.

According to one aspect of the invention, a packaging device for alignment between a planar lightguide circuit and an optical-fiber block includes: the planar lightguide circuit having an input port of an input waveguide, a plurality of output ports of output waveguides, arranged on the same surface as that of the input port of the input waveguide, and, at least one dummy waveguide arranged abutting the outermost end of the output waveguides; and, an output port of the dummy waveguide being arranged on the same surface, wherein the optical-fiber block has a plurality of ports corresponding to the input port of the input waveguide and the output ports of the output waveguides.

According to another aspect of the present invention, a packaging device for alignment between a planar lightguide circuit and an optical-fiber block includes: the planar lightguide circuit having an input port of an input waveguide; a plurality of output ports of output waveguides, arranged on the same surface as that of the input port, and at least one aligning waveguide having aligning ports, arranged on the same surface; and, a optical-fiber block having a plurality of ports each corresponding to the input port of the input waveguide, the output ports of the output waveguides, and the aligning port. The plurality of ports of the optical-fiber block is respectively coupled in alignment with the input port, the output ports, and the aligning ports.

According to a further aspect of the present invention, a packaging device for manufacturing an optical module of a beam splitter and an optical-fiber block in alignment includes: the beam splitter having an input port of an input waveguide; a plurality of output ports of output waveguides arranged on the same surface as that of the input port, and at least one aligning waveguide having aligning ports arranged on the same surface; and, the optical-fiber block having a plurality of ports each corresponding to the input port of the input waveguide, the output ports of the output waveguides, and the aligning port, wherein the plurality of ports of the optical-fiber block are coupled in alignment with the input port, the output ports, and the aligning ports, respectively.

BRIEF DESCRIPTION OF THE DRAWINGS

The above and other features and advantages of the present invention will become more apparent from the following detailed description when taken in conjunction with the accompanying drawings in which.

DETAILED DESCRIPTION OF THE PREFERRED EMBODIMENTS

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For purposes of simplicity and clarity, detailed descriptions of well-known devices, circuits, and methods are omitted so as not to obscure the description of the present invention with unnecessary detail.

Figure 1:
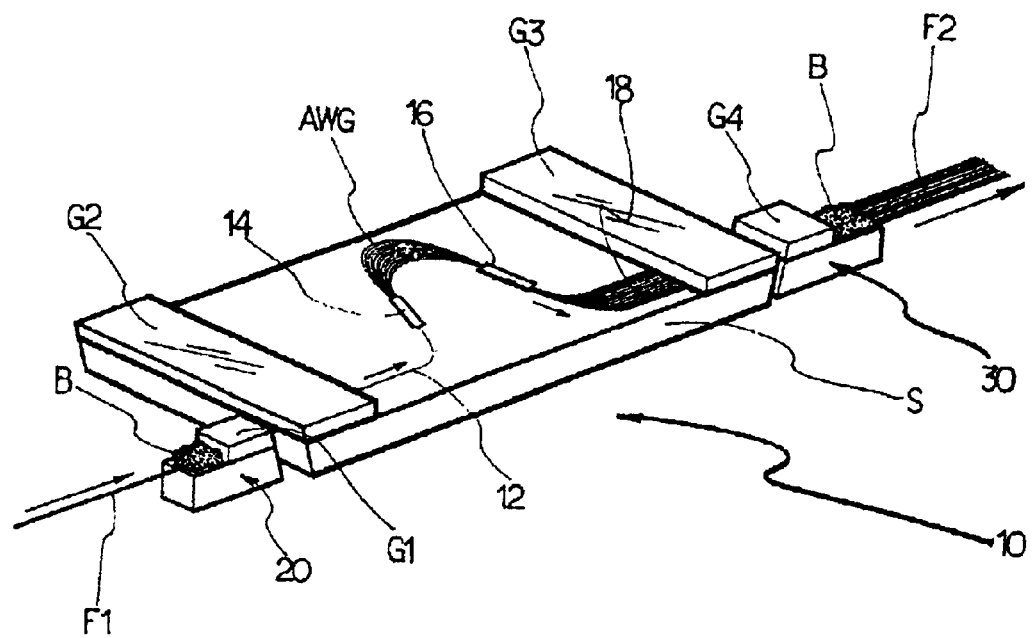
FIG. 1 is a schematic, partially enlarged, perspective view of a packaging device for a planar lightguide circuit according to a prior art.
Figure 2:
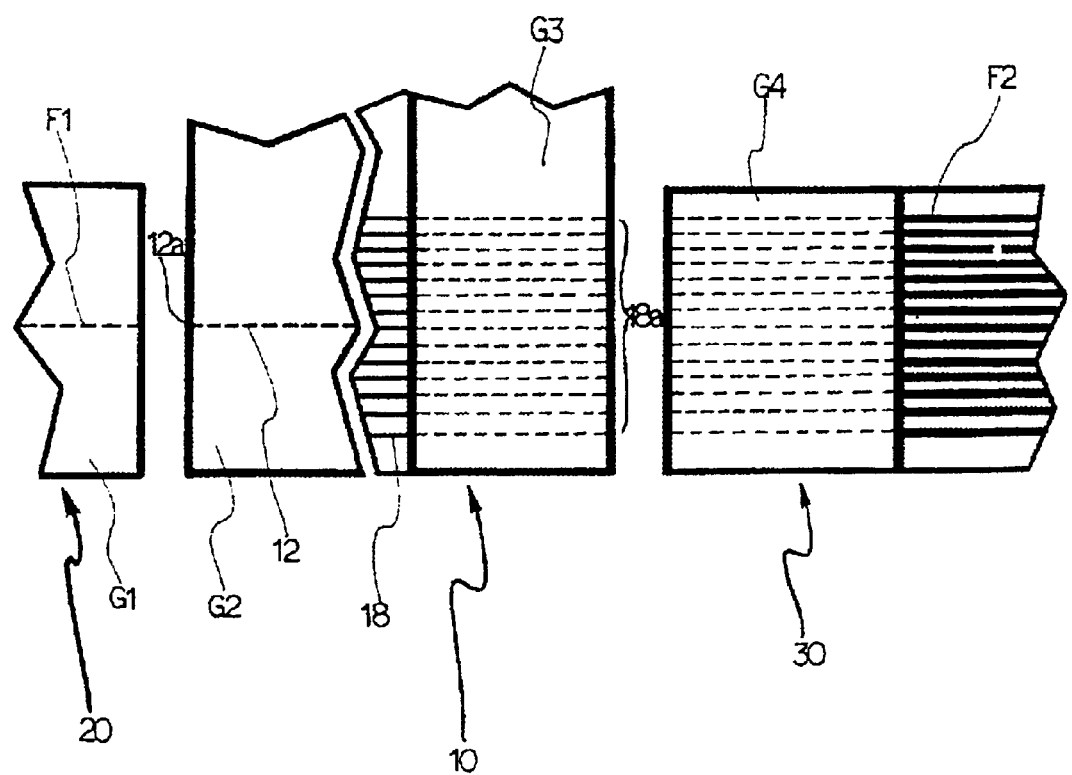
FIG. 2 is a schematic, partially enlarged, planar view of an aligned section between the planar lightguide circuit and its input/output optical-fiber blocks according to the prior art.
Figure 3:
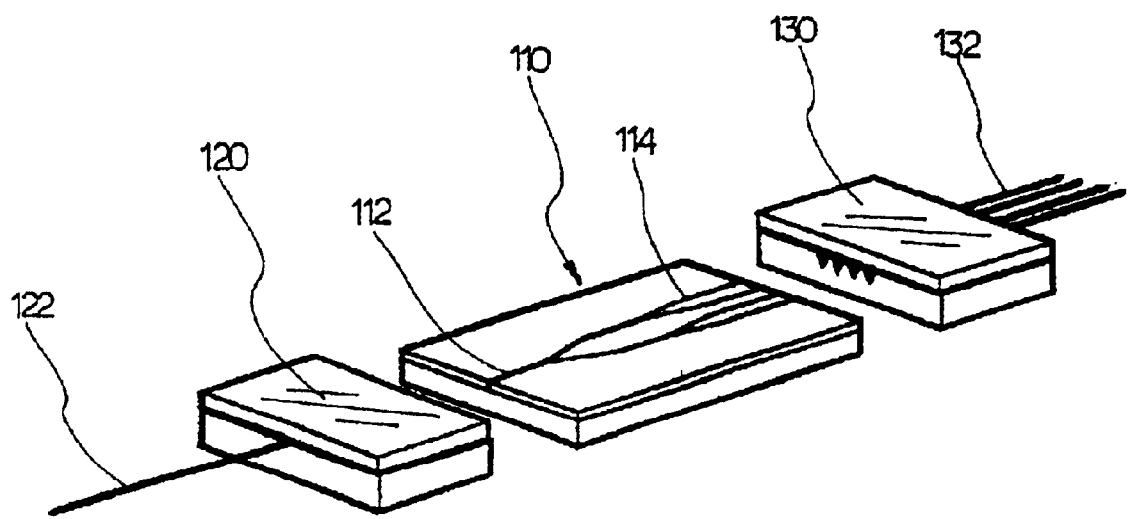
FIG. 3 is a schematic, partially enlarged, perspective view of a packaging device between a beam splitter and its input/output optical-fiber blocks according to another prior art.
Figure 4:
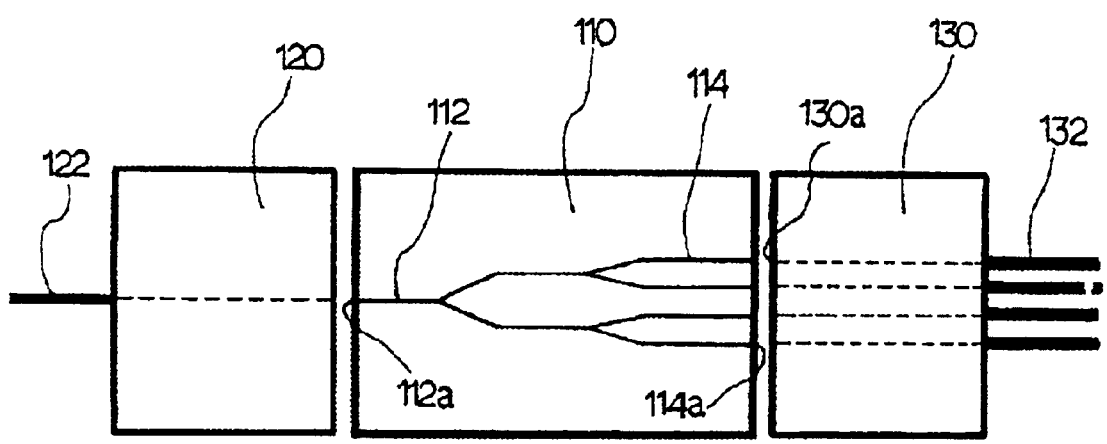
FIG. 4 is a schematic, partially enlarged, planar view of an aligned section between a beam splitter and its input/output optical-fiber blocks according to the prior art.
Figure 5:
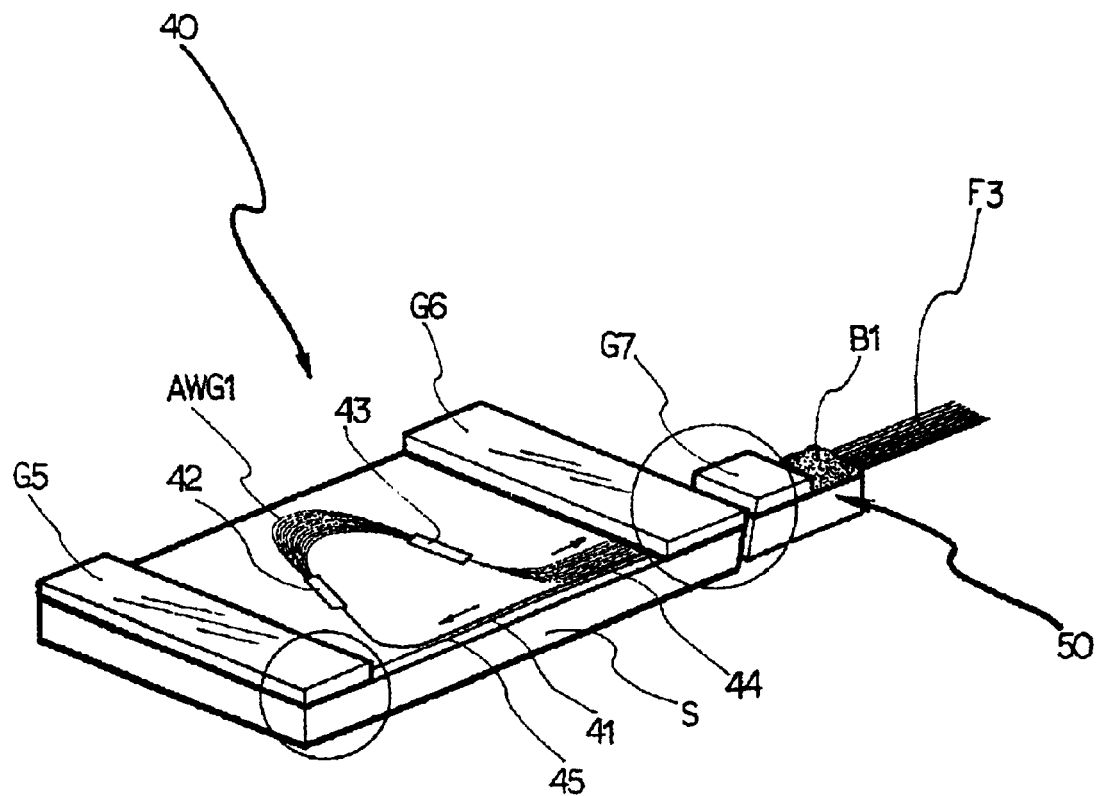
FIG. 5 is a schematic, partially enlarged, perspective view of a packaging device for a planar lightguide circuit according to a first preferred embodiment of the present invention.
Figure 6:
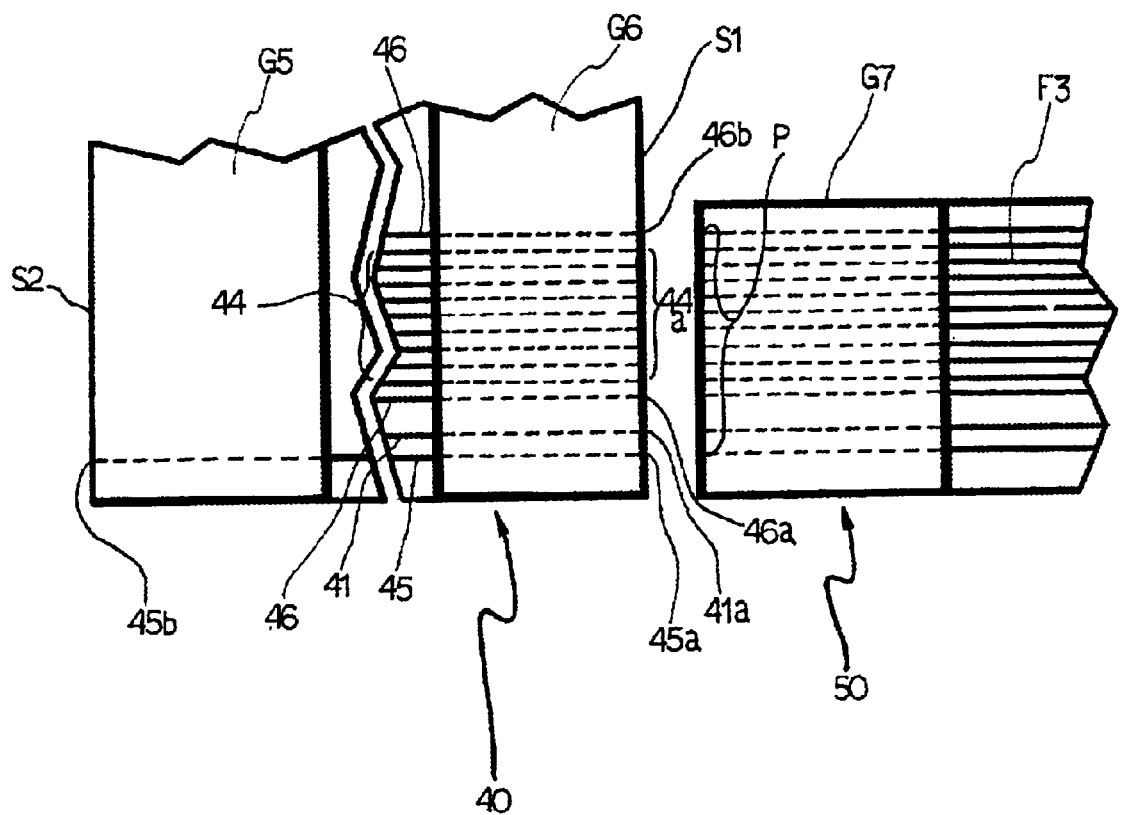
FIG. 6 is a schematic, partially enlarged, planar view of an aligned portion between a planar lightguide circuit and a single optical-fiber block according to the first referred embodiment of the present invention.

Referring now to FIGS. 5 and 6, a packaging device suitable for the planar lightguide circuit 40 according to a first preferred embodiment of the present invention will be described in more detail.

The packaging device according to the first preferred embodiment includes the planar lightguide circuit 40 having a set of input/output waveguide ports 41a and 44a disposed apart from each other on the same surface S1, and a single optical-fiber block 50 disposed in alignment with the set of input/output waveguide ports of the planar lightguide circuit 40. The single optical-fiber block 50 is fixably attached to each of the input/output waveguide ports of the planar lightguide circuit 40 using an adhesion material or means, such as epoxy resin, thermosetting adhesive, or welding. The single optical-fiber block 50 is coupled in alignment with the input port 41a of the input waveguide 41 and the output ports 44a of output waveguide 44 of the planar lightguide circuit 40, respectively. The input port 41a and the output ports 44a are formed on the identical edge surface S1 of the planar lightguide circuit 40, and both are disposed in the identical direction. Preferably, the input port 41a of the input waveguide 41 and the output ports 44a of the output waveguide 44 are spaced apart from each other and aligned with the single optical-fiber block 50.

The planar lightguide circuit 40 is an integrated element formed through a deposition of a multiplicity of thin layers, which consist of silica or polymer on a silicon or quartz substrate, serving as an optical waveguide for guiding the optical signal within a core of the fiber optic based on the difference in the refractive index between the core and its surrounding cladding.

In alignment between the planar lightguide circuit 40 and the single optical-fiber block 50, the input/output waveguide ports 41a and 44a of the planar lightguide circuit 40 are coupled with one end surface of the single optical-fiber block 50 facing each other. Preferably, the planar lightguide circuit 40 is provided with at least one aligning waveguide 45 for carrying out an initial alignment between the arrayed-waveguide-grating AWG1 and the single optical-fiber block 50, by projecting the light beam into the input waveguide 45a and then measuring the optical power via the aligning waveguide 45, and it is further provided with at least one dummy waveguide 46 at both ends of the output waveguide 44.

The aligning waveguide 45 includes an input-aligning port 45a and an output-aligning port 45b, in which the input-aligning port 45a is coupled in alignment with one end of the single optical-fiber block 50. Note that the output-aligning port 45b is not disposed on the same surface S1 as in the input-aligning input port 45a. The output-aligning port 45b is disposed on the other edge surface S2 opposite to the surface S1, so that the aligning waveguide 45 is constructed in the form of a straight waveguide. Accordingly, the input-aligning port 45a is coupled in alignment with one end of the single optical-fiber block 50, facing its ending surface, while the output-aligning port 45b is disposed without facing the other end of the single optical-fiber block 50. The input-aligning port 45a is positioned in the outermost end of a multiplicity of ports including the input/output waveguide ports on the edge surface S1.

Preferably, at least one aligning waveguide 45 is provided in the form of a straight waveguide on the planar lightguide circuit 40 and at least one dummy waveguide 46 also is provided next to the outermost ones of the output waveguides 44. In the meantime, the single optical-fiber block 50 aligned with the planar lightguide circuit 40 is also provided in its one end with a plurality of ports (P) corresponding to the plurality of waveguide ports of 41a, 44a, 45a, and 46a in alignment with them. The single optical-fiber block 50 is a block for supporting a ribbon-type fiber-optic cable F3, which is affixed to a V-shaped groove (not shown) formed on a silicon or quartz substrate (S) using the adhesive material (B). For the purpose of clarity and simplicity, the adhesive material is omitted in the drawing of FIG. 6 not to obscure the understanding of the present invention.

According to the foregoing description of the first preferred embodiment, a light beam incident to the input waveguide 41 through the input port 41a sequentially passes through a light channel consisting of a first star coupler 42, an arrayed-waveguide-grating AWG1, a second star coupler 43, and the output waveguide 44, then outputs through the output port 44a.

Preferably, the optical glass of upper plates G5 and G6 may be affixed to the part of the planar lightguide circuit 40 for better workability after arrangement of the aligned ribbon-type fiber-optic cable F3 onto the single optical-fiber block 50, and another glass of upper plate G7 also may be affixed thereto for better workability. Furthermore, an optical lens (not shown) may be provided in a position just before the output-aligning waveguide 45b in order to measure the optical power initially to perform the initial alignment. That is, the alignment between the arrayed-waveguide-grating AWG1 and the single optical-fiber block 50 is performed by projecting the light beam into the input waveguide 41 and then by measuring the optical power via the dummy waveguide 46.

Figure 7:
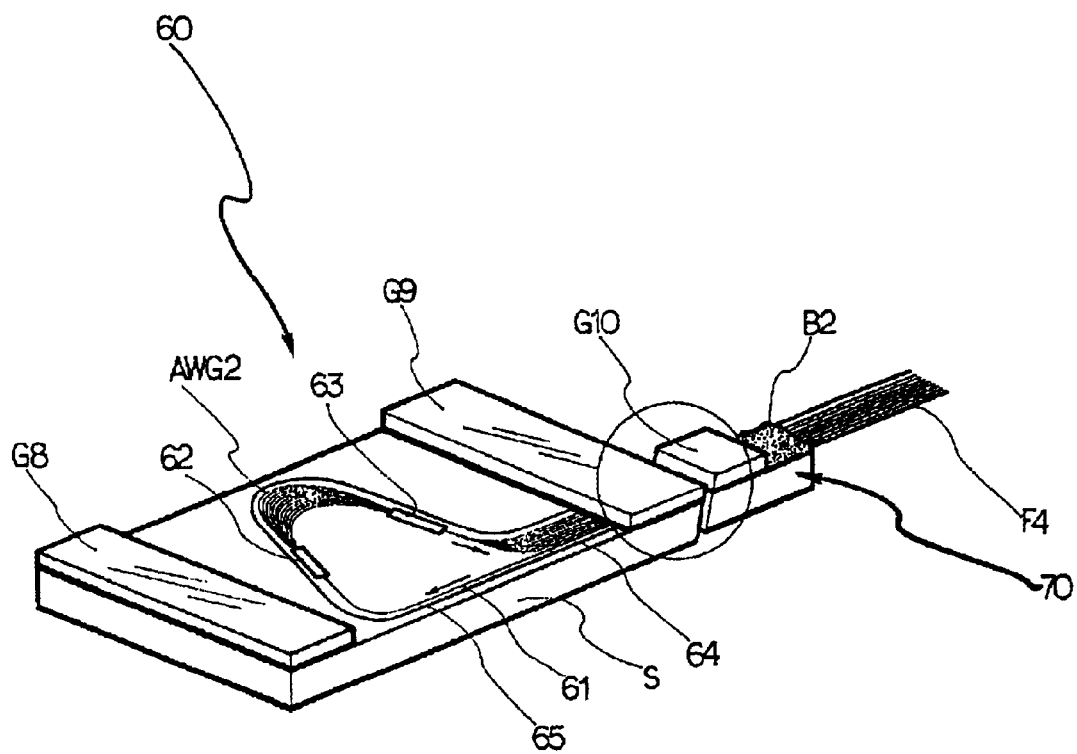
FIG. 7 is a schematic, partially enlarged, perspective view of a packaging device for a planar lightguide circuit according to a second preferred embodiment of the present invention.
Figure 8:
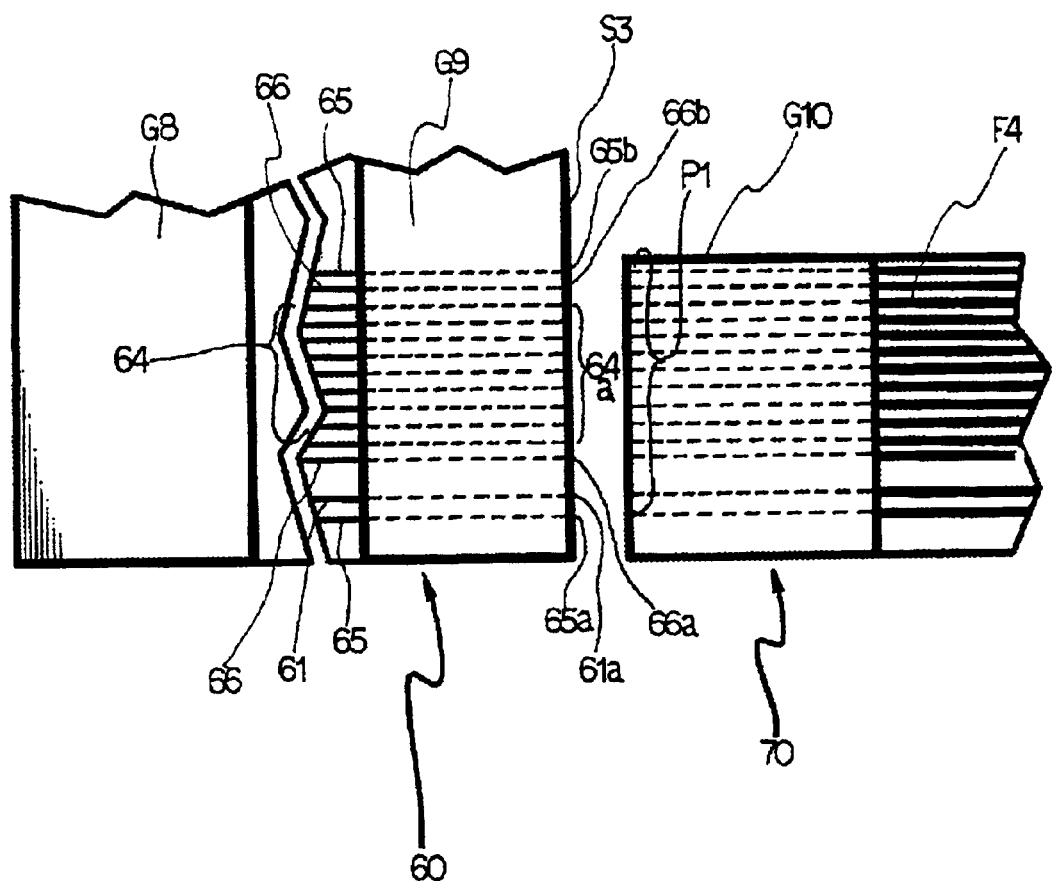
FIG. 8 is a schematic, partially enlarged, planar view of an aligned portion between a planar lightguide circuit and a single optical-fiber block according to the second preferred embodiment of the present invention.

Referring now to FIGS. 7 and 8, a packaging device suitable for the planar lightguide circuit 60 according to a second preferred embodiment of the present invention will be described in more detail.

The packaging device according to the second preferred embodiment includes a planar lightguide circuit 60 having an input port 61a for the input waveguide 61, a plurality of output ports 64a for the output wave guides 64, an input and output-aligning ports 65a and 65b of an aligning waveguide 65 disposed on the same surface S3 as in the input and output ports 61a and 64a, and a single optical-fiber block 70 disposed in alignment with the planar lightguide circuit 60. The single optical-fiber block 70 is provided with a plurality of connection ports P1 to be coupled in alignment with the input port 61a of the input waveguide 61, the output ports 64a for the output waveguides 64, and the input/output-aligning ports 65a and 65b of the aligning waveguide 65 through an adhesive material B2. The aligning waveguide 65 is arranged along the optical path and includes a straight waveguide section and a curved waveguide section. Also provided near the aligning waveguide are the input waveguide 61, the output waveguides 64, first and second star couplers 62 and 63, and an arrayed-waveguide-grating AWG2.

In the alignment between the planar lightguide circuit 60 and the single optical-fiber block 70, the input/output waveguide ports 61a and 64a and the input/output-aligning ports 65a and 65b of the planar lightguide circuit 60 are coupled in alignment with the plurality of ports on one end surface of the single optical-fiber block 70, facing each other. The input/output-aligning ports 65a and 65b are provided for carrying out the initial alignment between the planar lightguide circuit 60 and the single optical-fiber block 70.

The multiplicity of ports on the surface S3 of the planar lightguide circuit 60 is arranged from the top end in the order of the output-aligning port 65b of the aligning waveguide, the dummy port 66b of a dummy waveguide, the output ports 64a of the output waveguides, a dummy port 66a of the dummy waveguide, the input port 61a of the input waveguide, and the input-aligning port 65a of the aligning waveguide. In particular, the input-aligning port 65a and the output-aligning port 65b are disposed in both the outermost ends of the arrangement.

As a result, the difference of the second embodiment of the aligning device from the first embodiment is that the output-aligning port 65b of the aligning waveguide is provided on the same surface S3 as in the input-aligning port 65a. Furthermore, it is not limited to use only one aligning waveguide 65 in the present invention, but two or more aligning waveguides may be used. The single optical-fiber block 70 is further provided with a fiber-optic cable F4 as well as the plurality of connection ports for coupling in alignment with the corresponding multiplicity of ports of the planar lightguide circuit using the adhesive material. Preferably, the fiber-optic cable F4 may be of a ribbon-type fiber-optic cable with multiple channels, and the planar lightguide circuit 60 may be provided with glass upper plates G8 and G9 affixed thereto using the adhesive material B2 for better workability on manufacturing. Furthermore, another glass upper plate G10 may be bonded to the single optical-fiber block 70 for ensuring better workability by fixing the aligned fiber-optic cable F4.

Figure 9:
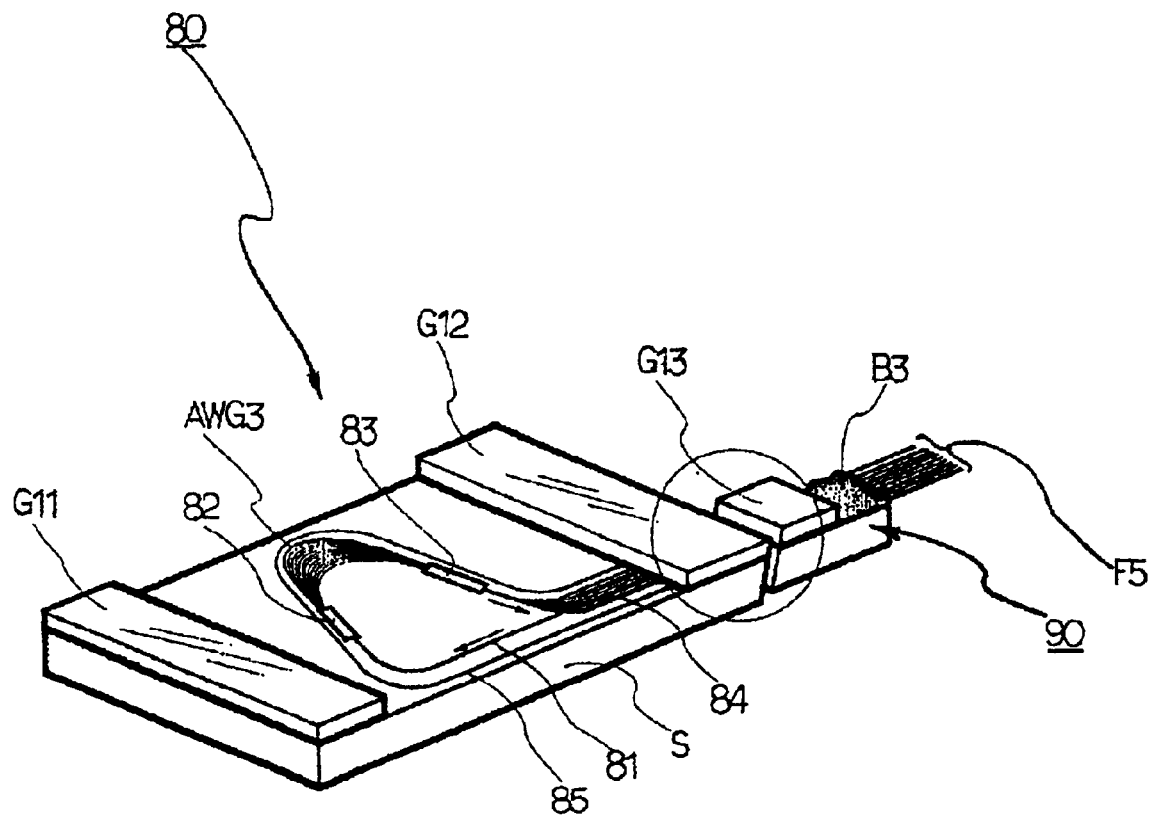
FIG. 9 is a schematic, partially enlarged, perspective view of a packaging device for a planar lightguide circuit according to a third preferred embodiment of the present invention.
Figure 10:
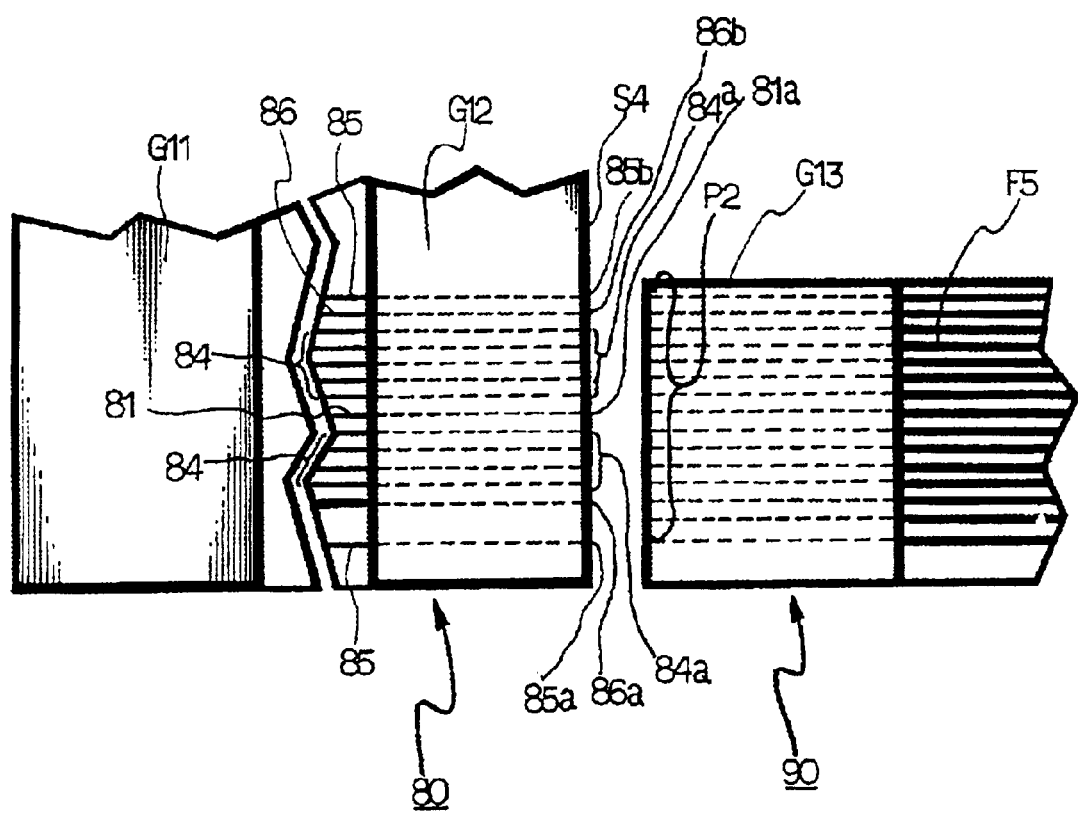
FIG. 10 is a schematic, partially enlarged, planar view of an aligned portion between a planar lightguide circuit and a single optical-fiber block according to the third preferred embodiment of the present invention.

Referring to FIGS. 9 and 10, the aligning device according to a third embodiment of the present invention includes a planar lightguide circuit 80 having a plurality of input/output ports 81a and 84a arranged on the same surface S4, and a single optical-fiber block 90 coupled in alignment with a plurality of corresponding waveguides of the planar lightguide circuit 80 using an adhesive means B 1, such as epoxy resin, thermosetting bonds, or welding.

The single optical-fiber block 90 should be coupled in alignment with the input port 81a of the input waveguide 81 and the output ports 84a of the output waveguide 84, respectively. The input port 81a and the output ports 84a are designed to form on the same edge surface S4 of the planar lightguide circuit 80, disposed in the identical direction. Preferably, the input port 81a of the input waveguide 81 and the output ports 84a of the output waveguide 84 are disposed, respectively, with a given spacing to each other, in the positions suitable for coupling in alignment with the single optical-fiber block 90.

An arrayed-waveguide-grating AWG3 formed on the planar lightguide circuit 80 is formed with a deposition of a multiplicity of thin layers, consisting of silica or polymer on a silicon or quartz substrate, for guiding the optical signal within a core of the fiber-optic based on the refractive index difference between the core and its surrounding cladding.

In alignment between the planar lightguide circuit 80 and the single optical-fiber block 90, the input/output waveguide ports 81a and 84a of the planar lightguide circuit 80 are coupled in alignment with one edge surface of the single optical-fiber block 90, facing each other. The input port 81a of the input waveguide 81 is disposed between the output ports 84a of the output waveguides 84, so that those output ports 84a are respectively arranged in the outer positions of the input port 81a of the input waveguide 81, with a given spacing to each other. Preferably, the planar lightguide circuit 80 is additionally provided with at least one aligning waveguide 85 for carrying out the initial alignment upon effecting the alignment between the planar lightguide circuit 80 and the single optical-fiber block 90, and it is further provided with at least one dummy waveguide 86 in both ending sides of the output waveguide 84, so as to construct a vernier-type of waveguide elements.

The aligning waveguide 85 further includes an input-aligning port 85a and an output-aligning port 85b on the same surface S4. The aligning waveguide 85 consists of two types of waveguide sections, i.e., a straight waveguide and a curved waveguide. The input-aligning port 85a and the output-aligning port 85b are coupled in alignment with one end of the single optical-fiber block 90, facing its ending surface, and the input and output-aligning ports 85a and 85b are respectively positioned next to both outermost ends of the multiplicity of ports arranged on the edge surface S4.

Preferably, the planar lightguide circuit 80 may be provided with one or more aligning waveguides 85 as required and also may be provided with one or more dummy waveguides 86 next to the outermost one of the output waveguides 84. The planar lightguide circuit 80 functions as an optical component for multiplexing the optical signal, including the input waveguide 81 for receiving the input light beam, a first star coupler 82, an arrayed-waveguide-grating AWG3, a second star coupler 83, and the output waveguides 84. The input waveguide 81 is disposed between the output waveguides 84 in parallel thereto. The structure and operation of the arrayed waveguide grating and the first and second star couplers 82 and 83 will be well understood to those skilled in the art, so any detailed description thereto is omitted here.

In the meantime, the single optical-fiber block 90 aligned with the planar lightguide circuit 80 is also provided, in its proximal end, with a plurality of associated ports (P2) to be coupled in alignment with the plurality of waveguide ports of 81 a, 84a, 85a, 85b, 86a, and 86b through an adhesive means B3. The single optical-fiber block 90 serves as a block for supporting a ribbon-type fiber-optic cable F5, which is affixed to a V-shaped groove (not shown) formed on a silicon or quartz substrate (S) using the adhesive means B3. The adhesive means is omitted in the drawing of FIG. 10 for the better understanding of the invention. Therefore, according to the above description of the preferred embodiment, a light beam, i.e., the optical carrier signal, incident upon the input waveguide 81 through the input port 81a sequentially passes through an optical channel consisting of the first star coupler 82, the arrayed-waveguide-grating AWG3, the second star coupler 83, and the output waveguide 84, and then outputted through the output port 84a.

Preferably, the upper plates G11 and G12 of optical glass may be additionally provided to cover at least a part of the planar lightguide circuit 80, for better workability on manufacturing, and another upper plate G13 of optical glass may be further provided to cover at least a part of the optical-fiber block 90 for better workability by fixing the aligned fiber-optic cable F3 onto the optical-fiber block 90. Further, an optical lens (not shown) may be provided in a position just before the output-aligning waveguide 85b in order to measure the optical power and then carry out the initial alignment for the single optical-fiber block 90. In this way, the alignment between the arrayed-waveguide-grating AWG3 and the single optical-fiber block 90 can be carried out by projecting the light beam into the input waveguide 81 and then measuring the optical power in the dummy waveguide 86.

Figure 11:
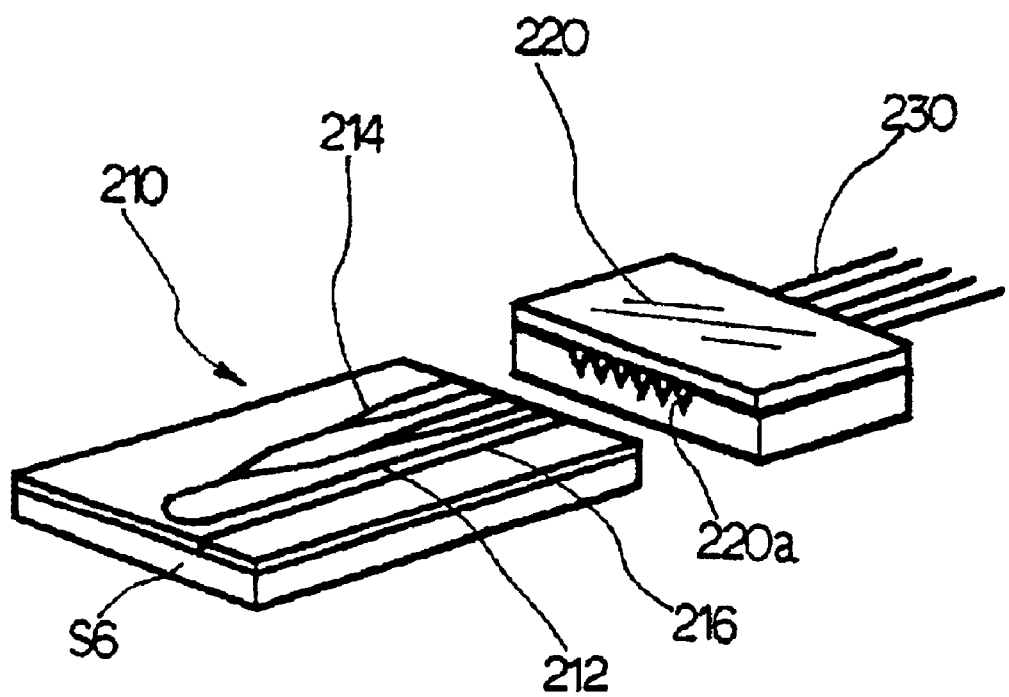
FIG. 11 is a schematic, partially enlarged, perspective view of a packaging device for a beam splitter and a single optical-fiber block according to a fourth preferred embodiment of the present invention; and, FIG. 12 is a schematic, partially enlarged, planar view of an aligned portion between a beam splitter and a single optical-fiber block according to the fourth preferred embodiment of the present invention.
Figure 12:
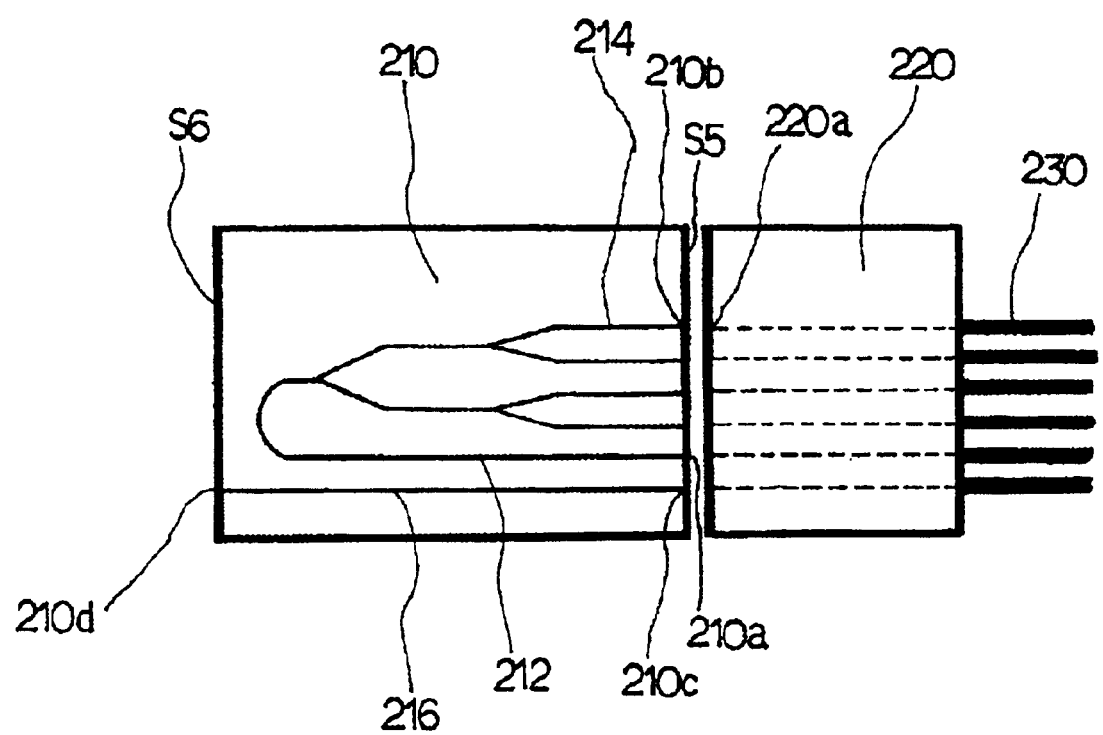

Referring now to FIGS. 11 and 12, a packaging device comprised of a beam splitter 210 and a single optical-fiber block 220 according to a fourth preferred embodiment of the present invention will be described.

The beam splitter 210 includes an input port 210a and a plurality of output ports 210b arranged on the same surface S5 and spaced apart from each other with a given gap, and a single optical-fiber block 220 coupled in alignment with the surface S5 of the beam splitter using the adhesive means B1, such as epoxy resin, thermosetting bonds, or welding. The single optical-fiber block 220 is coupled in alignment with the input port 210a of input waveguide 212 and the output ports 210b of output waveguide 214, respectively. These input port 210a and the output ports 210b are formed on the same edge surface S5 of the beam splitter 210, disposed in the identical direction. Preferably, the input port 210a of the input waveguide 212 and the output ports 210b of output waveguide 214 of the beam splitter 210 are spaced apart by a given spacing between them, in the position suitable for coupling in alignment with the single optical-fiber block 220, more particularly, on the edge coupling surface S5 facing the single optical-fiber block 220. Furthermore, in the alignment between the beam splitter 210 and the single optical-fiber block 220, the beam splitter 210 may be preferably provided with at least one aligning waveguide 216 for carrying out the initial alignment between both of them.

The aligning waveguide 216 includes an input-aligning port 210c and an output-aligning port 210d, in which the input-aligning port 210c is coupled in alignment with one end of the single optical-fiber block 220, while the output-aligning port 210d is not disposed on the same surface S5 as in the input-aligning input port 210c. The output-aligning port 210d, however, is disposed on the other edge surface S6 opposite to the surface S5, such that the aligning waveguide 216 is configured in the form of a straight waveguide provided with the input and output-aligning ports 210c and 210d in its opposite edge surfaces, respectively. Accordingly, the input-aligning port 210c is disposed in the outermost end of those ports on the coupling surface S5.

The single optical-fiber block 220 aligned with the beam splitter 210 is also provided in its one end with a plurality of ports 220a matching the plurality of waveguide ports of 210a, 210b, and 210c. According to the above structure of the beam splitter, a light beam, i.e., the optical signal incident upon the input waveguide 212 via the input port 210a, is transferred along the optical path to the output ports 210b through the output waveguide 214. As a result, the present invention makes it possible to achieve the alignment between a planar lightguide circuit and an optical-fiber block simply by arranging the input/output ports of the planar lightguide circuit at one end of the surface.

As apparent from the foregoing description, it will be understood that the alignment between the planar lightguide circuit and the single optical block according to the present invention allows the size of an optical communication module to be greatly reduced, by coupling the input/out ports of the input and output waveguides with the single optical block in alignment with the same. Furthermore, such a single process of alignment between the planar lightguide circuit and the single optical block according to the present invention will lead to a reduced alignment time on manufacturing the planar lightguide circuit.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A packaging device for aligning between a planar lightguide circuit and an optical-fiber block, comprising:
   said planar lightguide circuit comprising;
      an input port of an input waveguide,
      a plurality of output ports of output waveguides, arranged on the same surface as said input port of the input waveguide, and,
      at least one dummy waveguide arranged abutting the outermost end of said output waveguides, an output port of said dummy waveguide being arranged in the same surface; and,
   said optical-fiber block comprising a plurality of ports corresponding to said input port of the input waveguide and said output ports of the output waveguides, said optical-fiber block being coupled in alignment with said input port of the input waveguide and said output ports of the output waveguides.

2. The packaging device according to claim 1, wherein said planar lightguide circuit further comprises at least one aligning waveguide for carrying out an initial alignment.

3. The packaging device according to claim 2, wherein said aligning waveguide is used to measure the intensity of the optical power of an optical signal with an optical-measuring device.

4. The packaging device according to claim 2, wherein said aligning waveguide comprises an input-aligning port and an output-aligning port, said input-aligning port being arranged on said same surface.

5. The packaging device according to claim 2, wherein said aligning waveguide is disposed substantially in line with said output waveguides, and comprises a straight waveguide section in close proximity to the outermost one of said output waveguides.

6. The packaging device according to claim 4, wherein said output-aligning port of said aligning waveguide is arranged on a different surface other than said same surface.

7. The packaging device according to claim 1, wherein said input port of said input waveguide is arranged between said output ports of said output waveguides.

8. A packaging device for aligning between a planar lightguide circuit and an optical-fiber block, comprising:
   said planar lightguide circuit comprising;
      an input port of an input waveguide,
      a plurality of output ports of output waveguides, arranged on the same surface as said input port, and,
      at least one aligning waveguide having aligning ports arranged in the same surface, said aligning waveguide extends longitudinally across the planar lightguide circuit from the same surface of the input and output ports to an opposite edge surface of the planar lightguide circuit; and,
   said optical-fiber block comprising a plurality of ports each corresponding to said input port of the input waveguide, said output ports of the output waveguides, and said aligning port, said plurality of ports of said optical-fiber block being coupled in alignment with said input port, said output ports and said aligning ports, respectively;
   wherein said aligning ports are arranged, spaced apart from each other, in proximity to an outermost end of said output waveguide.

9. The packaging device according to claim 8, wherein said aligning ports comprise an input-aligning port and an output-aligning port.

10. The packaging device according to claim 9, wherein both of said input-aligning port and said output-aligning port are arranged on the same surface.

11. The packaging device according to claim 8, wherein said aligning waveguide is disposed in line with said input and output waveguides, in close proximity to said input and output waveguides.

12. The packaging device according to claim 8, wherein said aligning waveguide comprises a straight waveguide section and includes a curved waveguide section.

13. The packaging device according to claim 8, wherein said output waveguide comprises a dummy waveguide.

14. The packaging device according to claim 13, wherein said dummy waveguide is disposed in proximity to the outermost end of said output waveguides.

15. A packaging device for manufacturing an optical module of a beam splitter and an optical-fiber block in alignment, comprising:

said beam splitter comprising;
an input port of an input waveguide,
a plurality of output ports of output waveguides, arranged on the same surface as said input port, and,
at least one aligning waveguide having aligning ports arranged on said same surface, said aligning waveguide extends longitudinally across the beam splitter from the same surface of the input and output ports to an opposite edge surface of the beam splitter; and, said optical-fiber block comprising a plurality of ports each corresponding to said input port of the input waveguide, said output ports of the output waveguides, and said aligning port, said plurality of ports of said optical-fiber block being coupled in alignment with said input port, said output ports and said aligning ports, respectively.

16. The packaging device according to claim 15, wherein said aligning ports comprise an input-aligning port and an output-aligning port.

17. The packaging device according to claim 16, wherein both of said input-aligning port and said output-aligning port are arranged on the same surface.

18. The packaging device according to claim 16, wherein said input-aligning port and said output-aligning port are arranged, spaced apart from each other, in proximity to the outermost end of said output waveguide.

19. The packaging device according to claim 15, wherein said aligning waveguide is disposed in line with said input waveguide, in close proximity to said input waveguide.

20. The packaging device according to claim 15, wherein said aligning waveguide comprises a straight waveguide.

* * * * *